(No Model.) 6 Sheets—Sheet 4.
R. PEDERSON.
CORN HARVESTER.

No. 522,385. Patented July 3, 1894.

Witnesses.
E. F. Elmore
Frank D. Merchant

Inventor.
Rasmus Pederson
By his Attorney.
Jas. P. Williamson

(No Model.) 6 Sheets—Sheet 5.

R. PEDERSON.
CORN HARVESTER.

No. 522,385. Patented July 3, 1894.

Witnesses.
E. F. Elmore
Frank D. Merchant

Inventor.
Rasmus Pederson
By his Attorney.
Jas. F. Williamson

UNITED STATES PATENT OFFICE.

RASMUS PEDERSON, OF DRAMMAN, MINNESOTA.

CORN-HARVESTER.

SPECIFICATION forming part of Letters Patent No. 522,385, dated July 3, 1894.

Application filed June 26, 1893. Serial No. 478,775. (No model.)

*To all whom it may concern:*

Be it known that I, RASMUS PEDERSON, a citizen of the United States, residing at Dramman township, in the county of Lincoln and State of Minnesota, have invented certain new and useful Improvements in Corn-Harvesters; and I do hereby declare the following to be a full, clear, and exact description of the invention, such as will enable others skilled in the art to which it appertains to make and use the same.

My invention relates to corn-harvesters.

In certain of its general features, my present machine is similar to the machine described in my former patent, No. 494,023, of date March 21, 1893. Several important features of improvement have, however, been added, with a view of rendering the machine more efficient.

My improved machine, will be hereinafter fully described and the novel parts and combinations of parts, therein contained, will be defined in the claims.

The machine is illustrated in the accompanying drawings, wherein like letters referring to like parts throughout,—

All parts of the machine, with the exception of the thills, are preferably made of metal.

The main frame is composed of longitudinal angle-iron bars $a$, spaced apart from each other and connected by cross-bars $a'$, $a^2$, $a^3$, of which the central and rear members are, as shown, composed of angle-iron bars, and the front member of which is a solid rectangular bar, placed edgewise in the vertical plane. The front cross-bar $a'$ and the rear bar $a^3$, are extended outward beyond the longitudinal bars $a$, for supporting some other parts. The longitudinal bars $a$ are extended forward of the front cross-bar $a'$, for supporting some of the other parts, and affording convenient points of attachment, for the thills $b$, which are pivotally secured to the front ends of the said bars $a$.

The main frame is carried on a pair of ground or driving wheels $d$, loosely mounted on the main axle or drive-shaft $d'$, which is journaled in the longitudinal frame-bars $a$; and on a centrally located rear wheel $d^2$, which is loosely mounted on an axle or cross-rod $d^3$. This rear axle $d^3$ is rigidly secured, at its ends, in end-blocks $d^4$, which are mounted with freedom for vertical motion in guideways $d^5$, formed by guide-strips $a^4$, fixed to the inner surfaces of the main-frame vertical side-plates $a^5$, which are fixed to and rise from the longitudinal frame-bars $a$. This construction permits the main frame to turn on the front axle or main shaft $d'$, or in the front ground wheels $d$, as a pivot, and to be raised or lowered at its rear end, with respect to the center-wheel $d^2$ and rear axle $d^3$, so as to set the front end of the machine at any desired pitch or cutting level. The said main frame is thus raised and lowered, at will, by a hand-lever $d^6$, pivoted to a fixed cross-rod $d^7$, and having an angular projection or arm $d^8$, connected by link $d^9$, with a cross rod $d^{10}$ fixed to the sliding-blocks $d^4$. The hand-lever $d^6$ has a spring-pawl $d^{11}$ engageable with a notched segment $d^{12}$, fixed to the cross-rod $d^7$, for holding the said lever $d^6$ and the main frame of the machine, in whatever position the same may be set on the supporting wheels.

Figure 5:
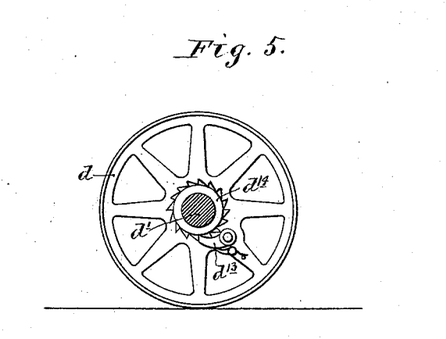
Fig. 5 is a detail, giving an inside view of one of the drive wheels, the main axle being shown in section.

The driving wheels $d$ are provided with spring-held driving pawls $d^{13}$, which work on fixed annular ratchets $d^{14}$, formed on the main shaft or axle $d'$. This construction, of course, causes the wheels $d$ to turn the axle or shaft $d'$ in the forward motion of the wheels, while permitting the wheels to slip or turn on the axle in the backward motion of the wheels. One of the wheels $d$ may therefore turn forward, while the other is turning backward, as required, for convenience, in turning around the machine.

The main shaft or axle $d'$ is provided with a sliding clutch hub or sleeve $d^{15}$, which carries on its inner end a bevel gear $d^{16}$, normally engaging a beveled pinion $d^{17}$ on a pitman driving shaft $d^{18}$. The sleeve $d^{15}$ is normally held in its innermost position by spring $d^{19}$, reacting against a collar $d^{20}$ on the shaft $d'$, and holding the said sleeve against clutch collar $d^{21}$ on the said shaft. The said sleeve $d^{15}$ may be shifted outward against the spring $d^{19}$ by a shipper-fork lever $d^{22}$, which is pivoted to a curved bracket $d^{23}$, rising from the middle cross-bar $a^2$ of the frame. The shipper-fork lever $d^{22}$, together with the sleeve $d^{15}$ may be held in its outermost or open position, by a spring-catch $d^{24}$, projecting laterally from the interior surface of the left side plate $a^5$. This construction permits the bevel-gear $d^{16}$ to be thrown in and out of gear with the pitman driving pinion $d^{17}$, at will. The pitman shaft $d^{18}$ carries, at its forward end, a crank disk $d^{25}$, having a pin $d^{26}$, to which are connected two pitmen-rods $d^{27}$, operating a pair of reciprocating knives or cutters $f$. These reciprocating cutters $f$ are seated, for transverse movement to the line of draft, in knife-boxes or seats $f'$, bolted or otherwise secured to the front frame-bar $a'$.

Figure 6:
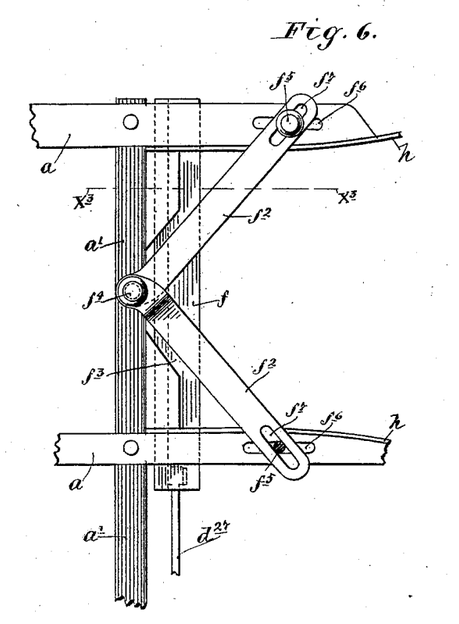
Fig. 6 is a bottom plan view of the knives, forming one of the gathering crotches.
Figure 7:
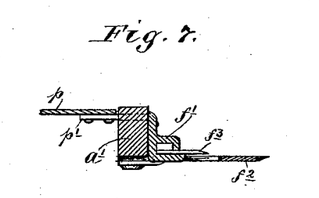
Fig. 7 is a detail in section, on the line $X^3 X^3$ of Fig. 6, the parts being placed right side up.

$f^2$ are pairs of knives set at angles to each other and obliquely to the line of draft, so that the knives themselves will form the gathering crotches of the machine. These crotch-knives $f^2$, co-operate with the reciprocating knives $f$ in the cutting action. The reciprocating knives $f$ are located at the angle or point of the crotch formed by the knives $f^2$; and the knife-box $f'$ is cut away on its under side, as shown at $f^3$ to permit the edges of the crotch-knives $f^2$ to be brought into substantially the same horizontal plane with the reciprocating knives $f$, or more accurately stated, into position directly below the said knives $f$, for co-operation therewith to operate on the stalks in the same kerf. The crotch-knives $f^2$ are pivotally secured to the front frame-bar $a'$, by a common pivot-bolt $f^4$, and are connected to the frame work at their forward ends by bolts $f^5$, working through slots $f^6$ in the frame-work and slots $f^7$ in the knives. This construction permits the knives $f^2$ to be adjusted, with respect to each other into any desired angular relation, so as to give to the crotch, formed by the said knives $f^2$, any desired pitch.

Gathering plates $h$ are fixed to the frame-work and are spaced apart from each other on opposite sides of the crotch formed by the knives $f^2$, and rise to a height about two-thirds that of the ordinary standing corn. These gathering plates $h$ diverge at their outer ends; and carry at their lower corners yieldingly held arighting arms $h'$. These arighting arms $h'$ are pivoted to brackets $h^2$, which are adjustably secured by slot and screw connection $h^3$, or otherwise, to the exterior edges of the gathering plates $h$. The upper ends of the arighting arms are connected with the bracket $h^2$, by springs $h^4$, which are of sufficient strength to hold the lower ends of the arms in their proper working position against any ordinary strain liable to be met with in lifting the stalks, but will yield, on meeting an excessive strain or fixed obstacle, thereby avoiding breakage. The arighting arms $h'$ are set on angles projecting downward and inward, with respect to the gathering plates $h$, for co-operation, from opposite sides of the row, under the forward movement of the machine, to lift up and aright the stalks, and assist in directing the same between the gathering plates $h$. The arighting arms $h'$ are held in their normal positions by the springs $h^4$ and stop-lugs $h^5$ bearing against the horizontal projecting arms of the brackets $h^2$. A very important improvement, in the operation of these arighting arms over prior devices employed for similar purposes, results from the above set forth manner of mounting said arms, to-wit: Whenever one of the arighting arms comes into contact with an obstacle not easily removed, its spring will yield, until said arm is thrown at a backward incline, with its arighting, or lower end to the rear of the pivotal center of the said arm, in which position it will readily clear itself from the obstacle, by passing over the same. Immediately upon its release from the obstacle, it will, as already indicated be thrown back into its normal position by its spring $h^4$.

Figure 1:
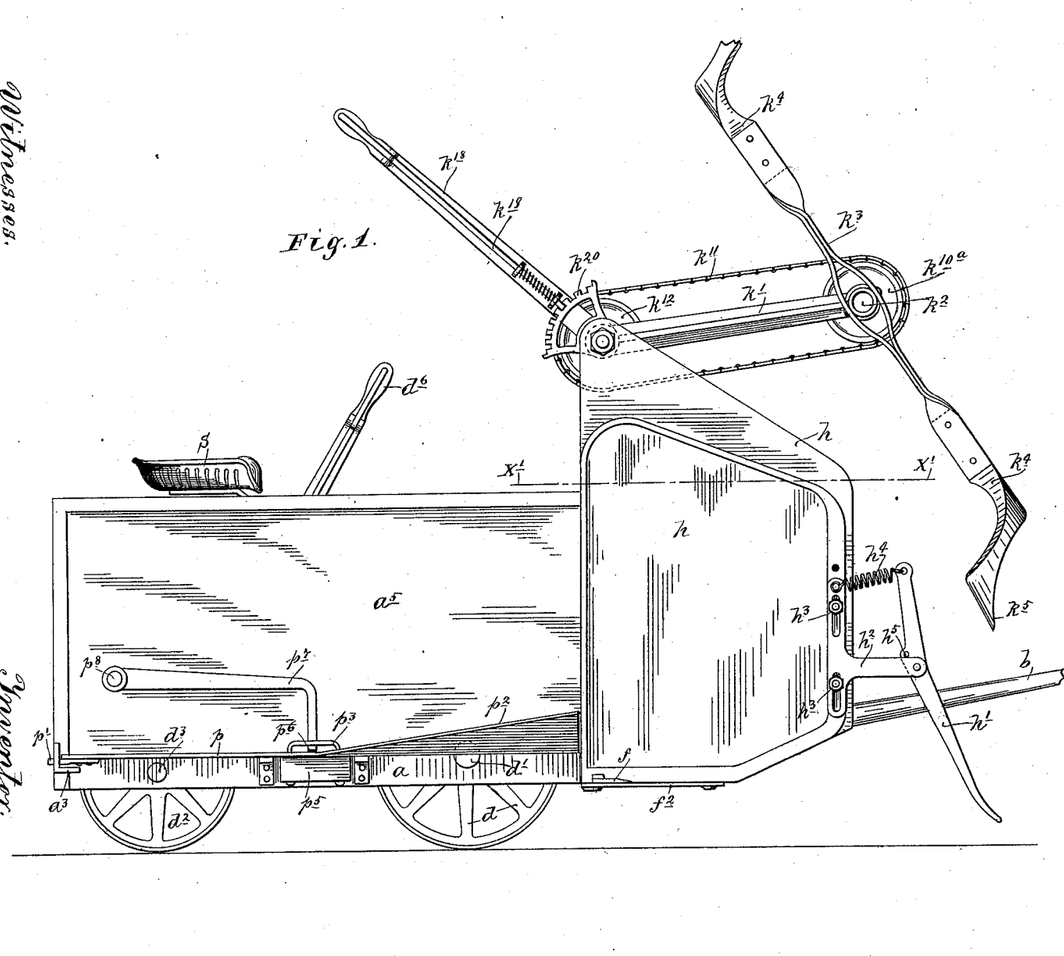
Figure 1 is a right side elevation of the machine, some parts being broken away.
Figure 2:
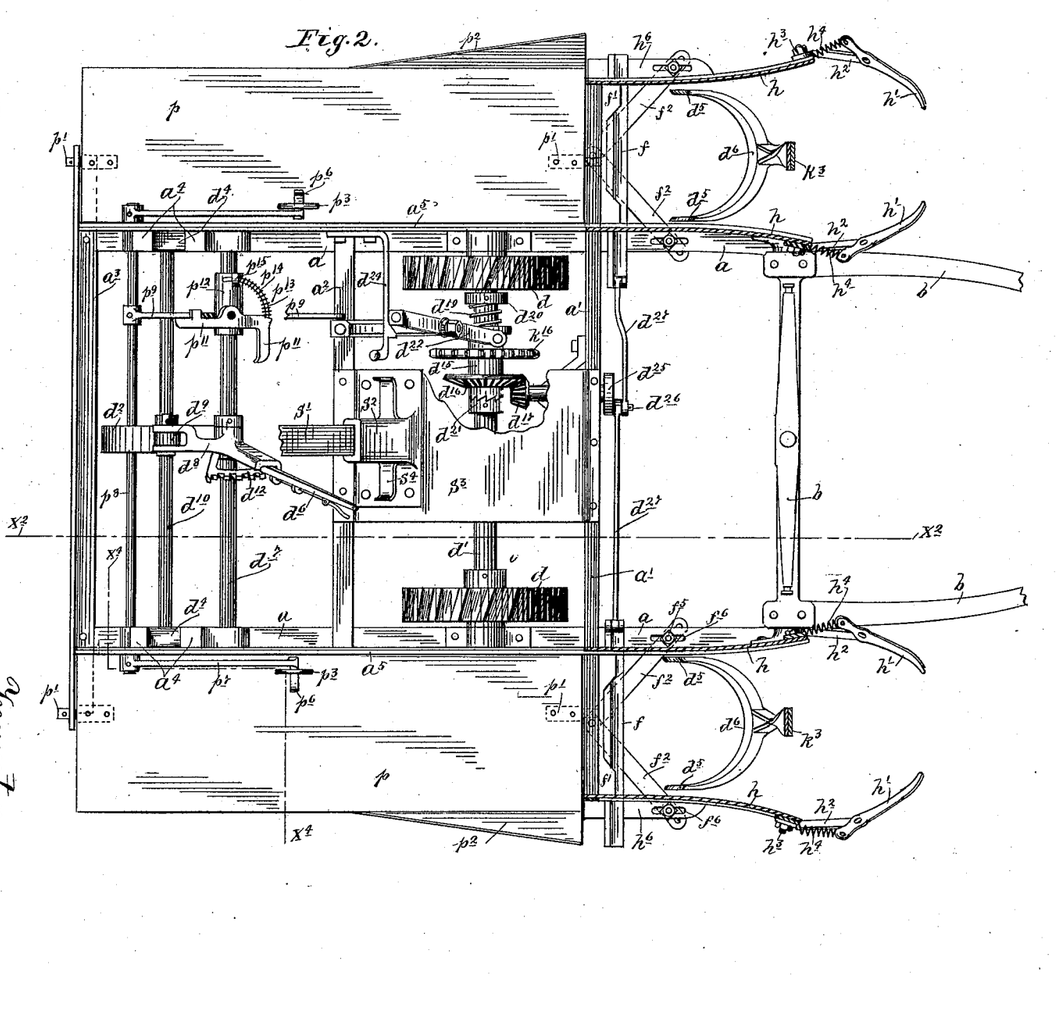
Fig. 2 is a view partially in plan and partially in horizontal section, on the line $X'X'$ of Fig. 1.
Figure 3:
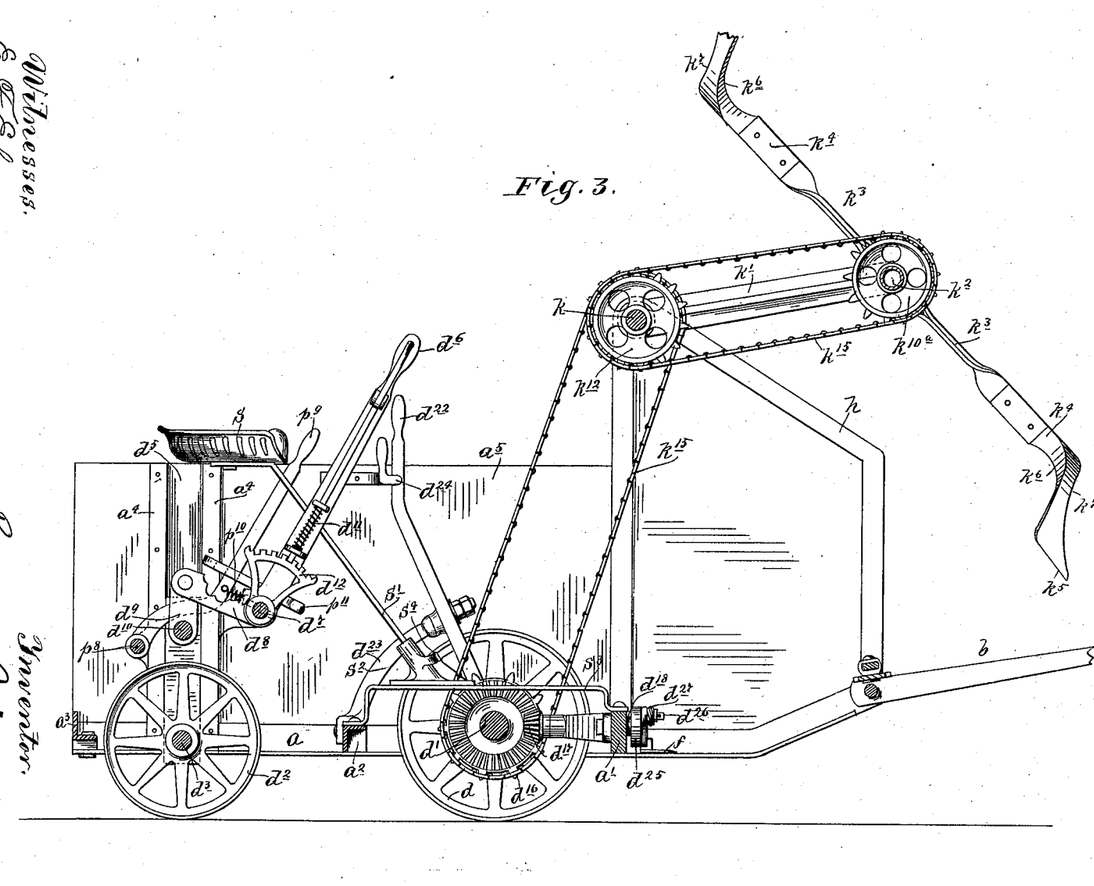
Fig. 3 is a vertical section, on the line $X^2 X^2$ of Fig. 2.
Figure 4:
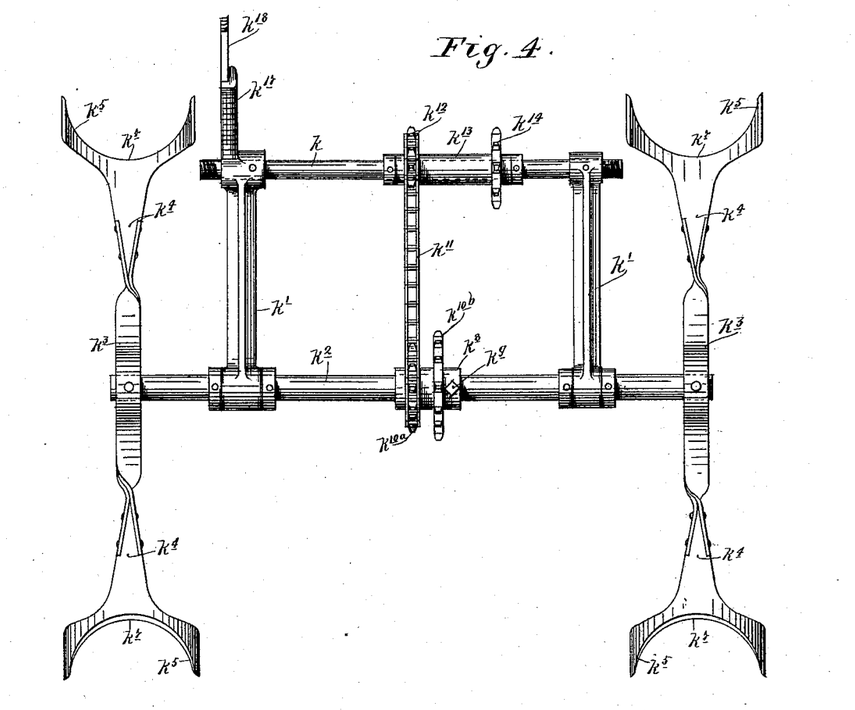
Fig. 4 is a plan view of the reel detached, looking from the front.

Bracket-irons $h^6$, projecting forward from the outer ends of the front cross-bar $a'$ of the main frame, co-operate with said cross-bar, to form supports for the outer members of the gathering plates $h$ and the outer members of the crotch-knives $f^2$. The gathering-plates $h$ are inclined on their upper edges being shorter at the front than at the rear, as shown in Figs. 1 and 3 of the drawings; and the inner members are higher than the outer members.

A rock-shaft $k$ is journaled in the upper corners of the inner gathering plates $h$. This rock-shaft $k$ has rigidly secured thereto, a pair of forwardly projecting arms $k'$, having shaft bearings at their forward ends. In the arms $k'$ is journaled a reel-shaft $k^2$, provided with a pair of reel arms $k^3$, one at each of its opposite ends. The reel arms $k^3$ are provided at their outer ends with reel blades $k^4$, the striking surfaces of which are concave in both the longitudinal and transverse planes of the reel arm, as clearly shown in Figs. 1, 2, 3 and 4. Otherwise stated, the blades $k^4$ may be roughly described, by stating that they are formed with a deep bowled spoon shaped body, the outer or tip portion of which is cut away on a concave line, to leave projecting curved prongs $k^5$. This gives the concave striking surface $k^6$, on the under side of the blade with reference to the axial line of the arm and the concave striking surface $k^7$, at the end of the blade. When the reel is in position, the reel arms work ahead of and between the gathering plates $h$, and co-operate with the arighting arms $h'$, to force the stalks of corn between the gathering plates and into the gathering crotches, under the forward motion of the machine. In virtue of the double concave surfaces $k^6$ and $k^7$ of the reel blades $k^4$, the said plates will have a gathering action on the stalks, not only at the initial portion of the reel blade stroke, but throughout the entire length of the same. In other words, the reel-blades $k^4$, in virtue of their shape, as described, will tend to center the gathered stalks, in the axial line of the blade, and will continue to hold the stalks in that position, until after they have been severed by the cutters and thrown back by the reel onto the bundle tables.

The reel shaft $k^2$ is provided with a central collar $k^8$, which is adjustable on the shaft, and may be fixed in any one of several desired positions, by a set-screw $k^9$ working into suitable seats on the shaft. This collar $k^8$ is provided with two or more sprocket wheels $k^{10a}, k^{10b}$ differing in size, one member of which is connected by a sprocket chain $k^{11}$ with a sprocket-wheel $k^{12}$ on a sleeve $k^{13}$ mounted on the rock-shaft $k$. The sleeve $k^{13}$ is provided with another sprocket-wheel $k^{14}$ connected by chain $k^{15}$ with a sprocket-wheel $k^{16}$ on the main driving sleeve $d^{15}$ carried by the main axle $d'$. Hence, whenever the sleeve $d^{15}$ is in motion, the reel shaft $k^2$ will be revolved in the proper direction to force the stocks against the cutters. The reel shaft $k^2$ is adjusted, with respect to the cutters, or upward and downward in an arc of a circle, by rocking the shaft $k$. For this purpose, one of the arms $k'$ is provided with a rearward projection $k^{17}$, having attached thereto a hand-lever $k^{18}$ with spring-pawl $k^{19}$ engageable with a notched segment $k^{20}$ fixed to the adjacent member of the inner gathering plates $h$, by means of which, the shaft $k$, together with the reel $k^2$ carried thereby, may be set in any desired position.

Figure 8:
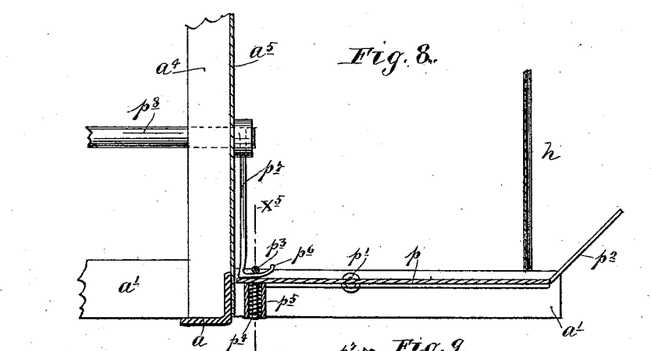
Fig. 8 is a view in vertical section, on the irregular line $X^4 X^4$ of Fig. 2, looking from the rear, one of the gathering plates being also shown in vertical section.
Figure 9:
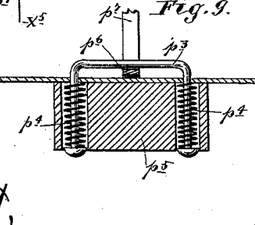
Fig. 9 is a detail or partial view in section, on the line $X^5 X^5$ of Fig. 8, looking inward.
Figure 10:
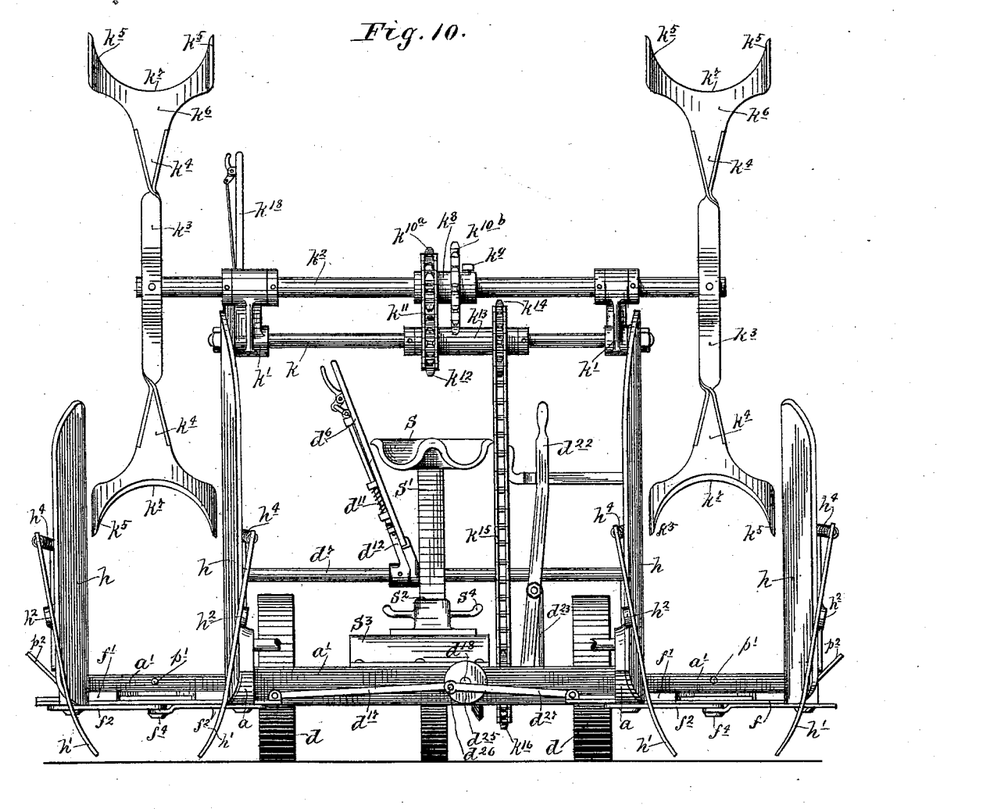
Fig. 10 is a front elevation of the machine, some parts being broken away and some parts being removed.

A pair of tables $p$ are pivoted to the main frame, directly in the rear of the gathering crotches and on the outside of the vertical plates $a^5$ and co-operating therewith to form bundle-carriers, for receiving the cut stalks and dumping the same in bunches on the ground. The tables $p$ are pivoted by trunnions $p'$, projecting from their ends, at points inward of their transverse centers, into suitable bearings on the fixed parts of the main frame. At the forward portion of their outer edges, tables $p$ are provided with angular upwardly projecting flanges or side-boards $p^2$, which prevent the stalks from dropping off. On their inner edges, at about their longitudinal centers, the said tables $p$ are provided with spring-seated staples $p^3$ (see Figs. 8 and 9), held in place, with their springs $p^4$, by guide-blocks $p^5$ fixed to the under sides of the tables. The staples $p^3$ are engaged by the elongated tips $p^6$ of the crank-shaped arms $p^7$, carried, outside the plates $a^5$, on the opposite ends of a rock-shaft $p^8$ journaled in the said vertical plates $a^5$. The tendency of the spring-seated staples $p^3$ on the hook-tips $p^6$ and the tables $p$, is to hold the same in their parallel horizontal positions. In other words, if the tables $p$ and the hook-tips $p^6$ should be separated or rocked apart, they would bear against each other, at the heel of the hook and the springs $p^4$ would tend to pull the said parts back into their normal horizontal position parallel with each other.

The rock-shaft $p^8$ is provided, between the plates $a^5$ with a hand-lever $p^9$, connected by spring $p^{10}$ with the fixed cross-rod or shaft $d^7$ secured in the plates $a^5$. The spring $p^{10}$ tends to throw the lever $p^9$ into its forward position, co-operating with the springs $p^4$ of the staples $p^3$, to throw the tables $p$ into their normal position.

A foot operated latch $p^{11}$ is pivoted, for lateral swinging motion, on a collar $p^{12}$ fixed to the rod $d^7$, and is normally held in its closed or latching position by a spring $p^{13}$, on guide-rod $p^{14}$, projecting from the heel of the latch and working through a guide-keeper $p^{15}$. The latch $p^{11}$ is adapted to engage with either the rear or front edge of the hand-lever $p^9$, to hold the tables $p$, either in their raised or lowered positions.

The pivotal bearings for the rear members of the table trunnions $p'$ are afforded by the laterally projecting vertical parts of the rear angle-bar frame plate $a^3$; and the horizontal parts of said angle-bar frame-plate $a^3$ form stops to limit the inward and downward motion of the tables $p$, for holding the same horizontal, when in their closed position.

Owing to the location of the table trunnions $p'$, inward of the transverse centers of the tables, the weight of the load of cut stalks will be distributed with the heaviest part of the same outside the trunnions. Hence, to dump the load, it is only necessary to release the hand-lever $p^9$, by operating the latch $p^{11}$, when under the gravity of the load, the tables $p$ will turn downward at their outer edges against the tension of the spring $p^{10}$, and the staple springs $p^4$, allowing the load or bunch of cut stalks to be dumped onto the ground. In this dumping action of the tables $p$, the hook-tips $p^6$ will be rocked apart from the inner edges of the tables. Hence, as quick as the load is dumped, the staple springs $p^4$ and the lever spring $p^{10}$ will restore the tables $p$ to their horizontal or normal positions at which time, the spring-held latch $p^{11}$ will be permitted by the driver to re-engage with the lever $p^9$ and lock the parts in their normal position.

The driver-seat $s$ is supported from a spring-standard $s'$ projecting from a central pedestal $s^2$, which is bolted to a center plate $s^3$, fixed to the cross-bars $a'$ and $a^2$ of the main frame. The pedestal $s^2$ is provided with foot-rests $s^4$. The driver-seat is properly located, for enabling the driver to reach and manipulate the various levers already mentioned, as may be required in the operation of the machine.

All the parts of the machine have now been specified, and the operation of the same, has been for the most part, stated in connection with the detailed description.

A review of the operation of the machine as an entirety, is not deemed necessary, for the purposes of this case. It is sufficient to note, as is obvious from the description, that the machine is designed for operation on two rows at one time. The draft animal walks between the two rows, and under the co-operation of the reel, the arighting arms and the gathering plates, the stalks are directed to the knife formed gathering crotches; and under the co-operation of the fixed crotch knives and the reciprocating transversely movable knives, the stalks are cut from their stubs, and, under the further action of the reel blades, are delivered onto the bundle-carriers, formed by the pivoted tables $p$ and the vertical side plates $a^5$. Whenever the cut stalks have accumulated on the tables $p$ to form bunches of the desired size, the driver trips the latch $p^{11}$, thereby releasing the tables and dumping the bunches.

By adjusting the frame on the supporting wheels, through the hand-lever $d^6$ and its connections, the cutters and gathering crotches may be set at any desired level or pitch, for the most advantageous action of the parts; and by adjusting the reel shaft, through the lever $k^{18}$ and its connections, the reel blades may be thrown into any position required for the best work, in co-operation with the other parts.

It has already been stated that the inner members of the gathering plates $h$ are of greater height than the outer members. The inner members are thus made high to prevent the stalks from toppling over between the side plates $a^5$ onto the working parts of the machine.

It should be noted that the connection between the dumping tables $p$ and the lever $p^6$ $p^7$, which as shown, is made by the spring seated staple $p^3$ $p^4$, affords a joint which is flexible, and will yield in one direction, but which is rigid or unyielding in the other. For instance, the joint thus formed will yield to permit the outer end of the table to pass over an obstacle, but, when power is applied to the dumping mechanism, as when returning the table from its dumping to its normal position, the said joint will be unyielding.

What I claim, and desire to secure by Letters Patent of the United States, is as follows:

1. In a corn harvester, the combination with a gathering crotch, of a pivotally mounted spring-held arighting arm or lever, the arighting or lower end of which may be thrown to the rear of the pivotal center of said arm, under excessive strain for passing an obstacle, substantially as described.

2. In a corn harvester, the combination with a gathering crotch, of a pair of spring-held arighting arms or levers, the arighting or lower ends of which may be thrown to the rear of the pivotal centers of said arms, and vertically adjustable supporting brackets to which said arighting arms are pivotally mounted, whereby, said arms may yield, under excessive strain, to pass an obstacle, substantially as described.

3. In a corn harvester, the combination with gathering crotches, of a pair of gathering plates co-operating with each crotch and a pair of yieldingly held arighting arms in advance of said plates projecting downward and inward and co-operating from opposite sides of the row, to lift up and aright the stalks, substantially as described.

4. In a corn harvester, a gathering reel having blades formed with striking surfaces, which are concave in both the longitudinal and transverse planes of the blades.

5. In a corn harvester, the reel blades $k^4$ formed with the projections $k^5$ and concave striking surfaces $k^6$ and $k^7$, substantially as and for the purpose set forth.

6. In a corn harvester, the combination with the gathering crotches, of the pairs of upright gathering plates, the pairs of yieldingly held arighting arms, in advance of the plates, and the co-operating reel blades $k^4$ having the projecting prongs $k^5$ and the concave striking surfaces $k^6$ and $k^7$, substantially as described.

7. In a corn-harvester, a dumping table, dumping mechanism for operating the table and a flexible connecting joint between said table and said dumping mechanism, which joint is constructed to yield in one direction and to remain unyielding in the other, substantially as described.

8. In a corn harvester, the combination with a dumping table, of a rocking arm for dumping the table, having an elongated laterally projecting tip and a spring seated staple connecting said tip with said table, the springs of which react against the table on the opposite side of the hook, whereby said springs will tend to restore the table to its normal position, substantially as described.

9. In a corn harvester, the combination with the rock shaft $p^8$ having the crank shaped arms $p^7$ with hook ends $p^6$, of the dumping tables $p$ and the spring seated staples $p^3$ connecting the hooks $p^6$ with said tables, substantially as described.

10. In a corn harvester, the combination with the dumping tables, of the rock-shaft $p^8$, the arms $p^7$ with hooks $p^6$, the spring seated staples $p^3$ connecting said hooks with said staples, the hand lever $p^9$, the spring $p^{10}$, and the foot operated spring-held latch $p^{11}$, all arranged and operating substantially as described.

In testimony whereof I affix my signature in presence of two witnesses.

RASMUS PEDERSON.

Witnesses:
BERTRAM JONES,
C. E. TAFT.